United States Patent
Sayana et al.

(10) Patent No.: US 7,912,113 B2
(45) Date of Patent: Mar. 22, 2011

(54) TECHNIQUES FOR ESTIMATING RECEIVED SIGNAL STRENGTH AND CARRIER TO INTERFERENCE AND NOISE RATIO IN OFDM SYSTEMS

(75) Inventors: Krishna Kamal Sayana, Lakemoor, IL (US); Xiangyang Zhuang, Lake Zurich, IL (US); Kenneth A. Stewart, Grays Lake, IL (US); Pallav Sudarshan, Waukegan, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 837 days.

(21) Appl. No.: 11/867,802

(22) Filed: Oct. 5, 2007

(65) Prior Publication Data

US 2009/0092178 A1 Apr. 9, 2009

(51) Int. Cl.
*H04L 27/30* (2006.01)
(52) U.S. Cl. ........ 375/142; 375/150; 375/343; 370/318; 370/342; 370/441; 370/479; 455/37.11; 455/226.2
(58) Field of Classification Search .................. 375/141, 375/142, 147, 150, 152, 340, 342, 343, 346; 370/318, 320, 342, 441, 464, 465, 479; 455/13.4, 455/67.11, 67.13, 226.1, 226.2, 226.3
See application file for complete search history.

(56) References Cited

U.S. PATENT DOCUMENTS

| 7,251,282 B2 * | 7/2007 | Maltsev et al. ............... 375/260 |
| 2006/0093074 A1 | 5/2006 | Chang et al. |
| 2006/0126491 A1 * | 6/2006 | Ro et al. ......................... 370/208 |
| 2006/0133260 A1 | 6/2006 | Kim et al. |
| 2007/0054681 A1 * | 3/2007 | Suh et al. ....................... 455/502 |
| 2007/0217495 A1 | 9/2007 | Han et al. |
| 2008/0045238 A1 * | 2/2008 | Zhou et al. .................. 455/456.1 |
| 2008/0267059 A1 * | 10/2008 | Bick et al. ..................... 370/210 |
| 2010/0203828 A1 * | 8/2010 | Zheng .......................... 455/12.1 |

OTHER PUBLICATIONS

PCT/US2008/078259 International Search Report Dec. 29, 2008, 4 pages.

* cited by examiner

*Primary Examiner* — Dac V Ha
(74) *Attorney, Agent, or Firm* — Sylvia Chen

(57) ABSTRACT

A technique for determining a received signal strength indicator of a target base station at a subscriber station includes performing a discrete Fourier transform on a received signal to provide a transformed signal. In this case, the transformed signal occupies one or more segments of a channel and the one or more segments each include multiple subcarriers. A shift-n cross-correlation is calculated based on the transformed signal and a preamble sequence of the target base station to provide a coarse received signal strength indicator for the target base station.

20 Claims, 5 Drawing Sheets

TECHNIQUES FOR ESTIMATING RECEIVED SIGNAL STRENGTH AND CARRIER TO INTERFERENCE AND NOISE RATIO IN OFDM SYSTEMS

FIELD OF THE DISCLOSURE

The present disclosure is generally directed to estimating received signal strength and, more particularly, to techniques for estimating received signal strength from one or multiple sources of interest and an associated carrier to interference and noise ratio at a subscriber station in a wireless network.

BACKGROUND

Various wireless networks use an estimated received signal strength indicator (RSSI) and an estimated carrier to interference and noise ratio (CINR) of a received signal to determine operational characteristics of the networks. For example, IEEE 802.16e compliant mobile stations (MSs) are required to estimate an RSSI and a CINR of a received signal. In general, CINR at an MS may be calculated as the ratio of an RSSI of a serving base station (BS) to summed RSSIs of interferer (non-serving) BSs plus a white noise power of a receiver of the MS. The RSSI associated with a serving BS has been used by an MS for uplink power control and the CINR, which has been reported to a serving BS, has been used by the serving BS to adapt a downlink transmission rate to link conditions. The CINR of a signal received from a non-serving BS (e.g., a potential handover target) may also need to be estimated and monitored by the MS to, for example, compare with the CINR of a current serving BS to determine whether a handover should be triggered. In general, any BS of interest, for which a CINR is to be estimated, may be referred to as a "target" BS.

Accurate reported CINRs are desirable, because inaccurate reported CINRs may impact performance of a cellular network. That is, reporting a CINR that is above an actual CINR may decrease network throughput due to re-transmission required after unsuccessful attempts, while reporting a CINR that is below the actual CINR may cause the serving BS to schedule data rates below a supportable rate. As another example, to identify potential handover candidates, an MS has also been required to track RSSIs and CINRs associated with non-serving BSs. Inaccurate RSSIs/CINR may trigger late or unnecessary handover. RSSI and CINR estimation is often determined from a specific pilot signal transmitted from one or more BSs. As an example, according to IEEE 802.16e, RSSI and CINR estimates are derived based on a preamble signal, which is an orthogonal frequency division multiple access (OFDMA) symbol that is transmitted at the beginning of each OFDMA frame. The preamble signals transmitted from BSs are unique to each BS, but the preamble signals can still interfere with each other due to non-orthogonal preamble sequences.

A number of techniques have been proposed to estimate CINR. For example, U.S. Patent Application Publication No. 2006/0133260 discloses a channel-estimation based-approach that isolates noise and interference components using pilot sequences and estimates a true channel power by subtracting a combined noise and interference power estimate from a total received power estimate. While this approach usually functions adequately for noise-limited systems (i.e., system where noise dominates interference), due to the non-orthogonality of the pilot sequences for serving and non-serving base stations (BSs), the CINR estimates provided by the approach may include an undesirable fixed bias in interference-limited systems (i.e., systems where interference dominates noise). As another example, U.S. Patent Application Publication No. 2006/0093074 discloses a difference-based approach for estimating CINR that assumes that sub-channels on adjacent pilot locations are the same. Based on this assumption, noise and interference components are isolated by subtracting adjacent received signals. However, assuming that sub-channels on adjacent pilot locations are the same may result in a fixed bias that is not insignificant compared with noise power at moderate to relatively high CINRs (e.g., CINRs of 15 decibel (dB) or higher).

Furthermore, neither of the above-described techniques distinguishes between interference and noise powers, i.e., both techniques combine interference power and noise power. In IEEE 802.16e compliant systems, RSSI and CINR estimates are based on a preamble signal, whose preamble signal power is boosted with respect to data signal power. While noise power is the same for the preamble signal and a data signal, signal and interference powers of the preamble signal are boosted as compared to the data signal. However, IEEE 802.16e requires reported RSSI and CINR to reflect a data signal power in a data zone (i.e., compensating for the power boosting in preamble). As such, accurate CINR estimates for a data zone are difficult to obtain for techniques that obtain a single estimate for combined noise and interference power. Additionally, at relatively low CINRs, e.g., 15 dB or less, errors in combined interference and noise power estimates may introduce large errors in RSSI.

What is needed are techniques for accurately determining received strength signal indicator and carrier to interference and noise ratio estimates for received signals.

BRIEF DESCRIPTION OF THE DRAWINGS

The present disclosure may be better understood, and its numerous features and advantages made apparent to those skilled in the art by referencing the accompanying drawings.

DETAILED DESCRIPTION

Figure 1:
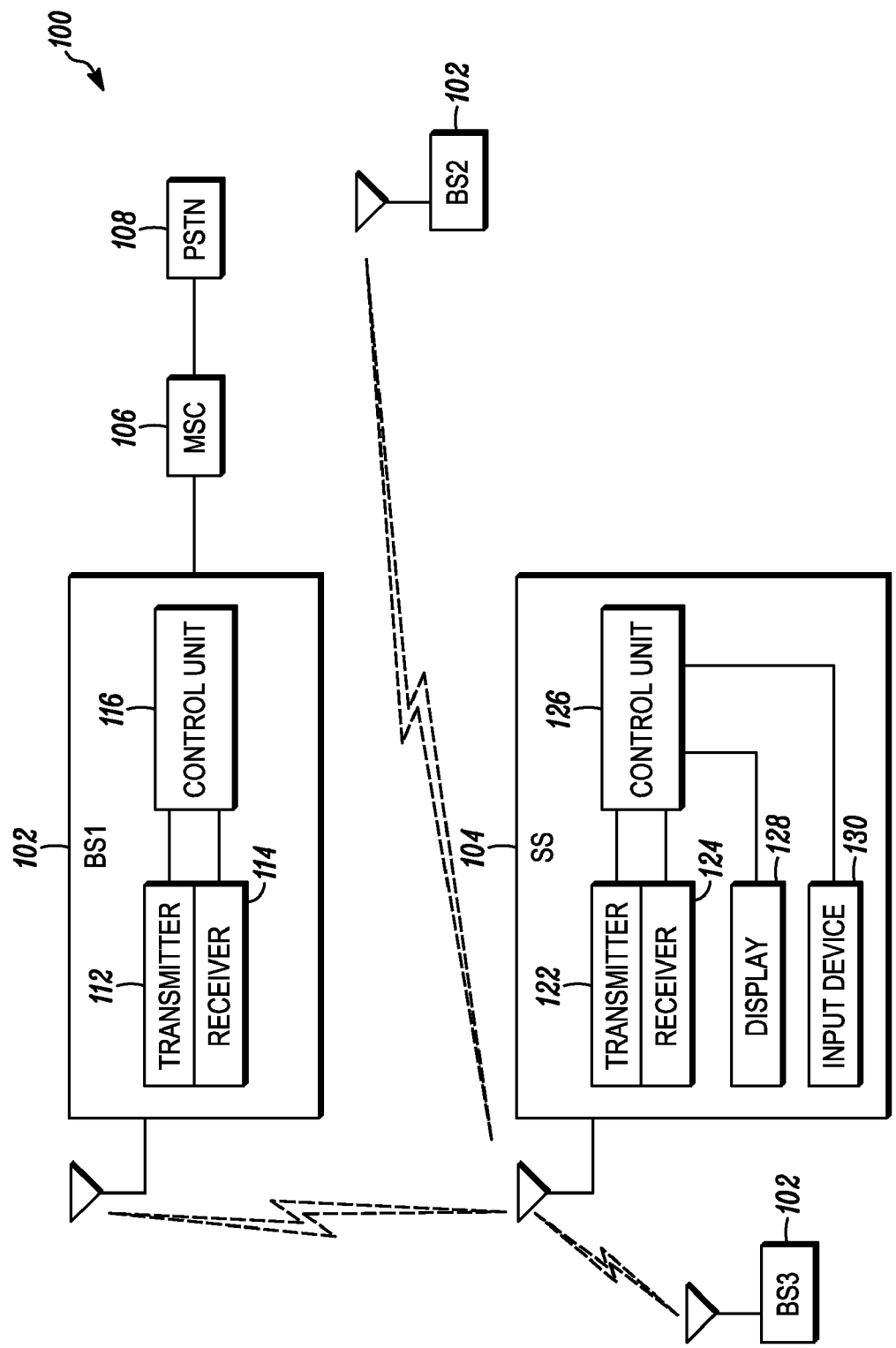
FIG. 1 is a block diagram of an example communication network that may be configured according to various embodiments of the present disclosure.

According to various aspects of the present disclosure, relatively low complexity received signal strength indicator (RSSI) estimates may be obtained without using channel estimation. In at least one embodiment, a hybrid approach that uses channel estimation may be employed to provide boosting-compensated carrier to interference and noise ratio (CINR) estimates. According to at least one aspect, RSSI estimates of serving and non-serving base stations (BSs) are obtained by first referencing a received signal to an appropriate preamble sequence (i.e., the preamble sequence for the BS whose RSSI is being estimated) and performing a shift-one cross-correlation between adjacent preamble subcarriers of the received preamble signal. Note that preamble subcarriers (i.e., subcarriers occupied by the preamble signal) can be non-consecutive or consecutive. While the discussion herein is directed to performing a shift-one cross-correlation, it should be appreciated that the techniques disclosed herein are broadly applicable to performing shift-n cross-correlations (wherein 'n' is one, two, three, etc.) between preamble subcarriers. For example, in a shift-3 cross-correlation a first preamble subcarrier and a fourth preamble subcarrier are cross-correlated The step of referencing a received signal to an appropriate preamble sequence amounts to dividing the received signal by the appropriate BS preamble sequence in actual signal processing. According to this approach, estimated RSSIs of a relatively large number of BSs can be determined in a relatively short period of time.

It should, however, be appreciated that the techniques disclosed herein are broadly applicable to determining RSSI and CINR on signals other than preamble signals. Dominant (or significant) interferers can then be detected based on estimated RSSIs (i.e., the dominant interferers are the interferers with the largest estimated RSSIs). Knowledge of dominant interferers is particularly useful in the configuration of advanced interference suppression receivers. Moreover, knowledge of dominant interferers usually facilitates relatively accurate CINR estimation.

As previously noted, RSSI and CINR estimates based on direct computation (i.e., subtracting a combined interference and noise power estimate of a received signal from a total received signal power), are usually biased due to the non-orthogonal nature of serving and non-serving BS preambles when, for example, at least one non-serving BS is transmitting on the same channel segment as the serving BS. However, referencing a received signal to an appropriate preamble sequence (i.e., dividing the received signal by an appropriate BS preamble sequence) and performing a shift-one cross-correlation between adjacent subcarriers of the divided received signal facilitate removal of the bias (attributable to non-orthogonal preamble sequences) from RSSI and CINR estimates.

According to another aspect of the present disclosure, bias in the combined interference and white noise power estimate due to non-ideal channel estimation, may be compensated by selecting an appropriate compensation factor derived from channel estimation filter coefficients. A noise power estimate may be generated by subtracting RSSI estimates of BSs (including, for example, serving and non-serving BSs) from total received power on each of the segments of the channel. The noise power estimate may then be averaged over multiple frames. An interference power estimate may be generated by adding the RSSIs of all the BSs, other than the target BS. It is further noted, if boosting compensation is not required, the combined estimate for interference and noise power may be better than the estimate obtained by summing the individual estimates. The CINR estimate can be obtained using individual or combined estimates (with or without boosting compensation), based on whether the system is interference-limited or noise-limited.

Figure 5:
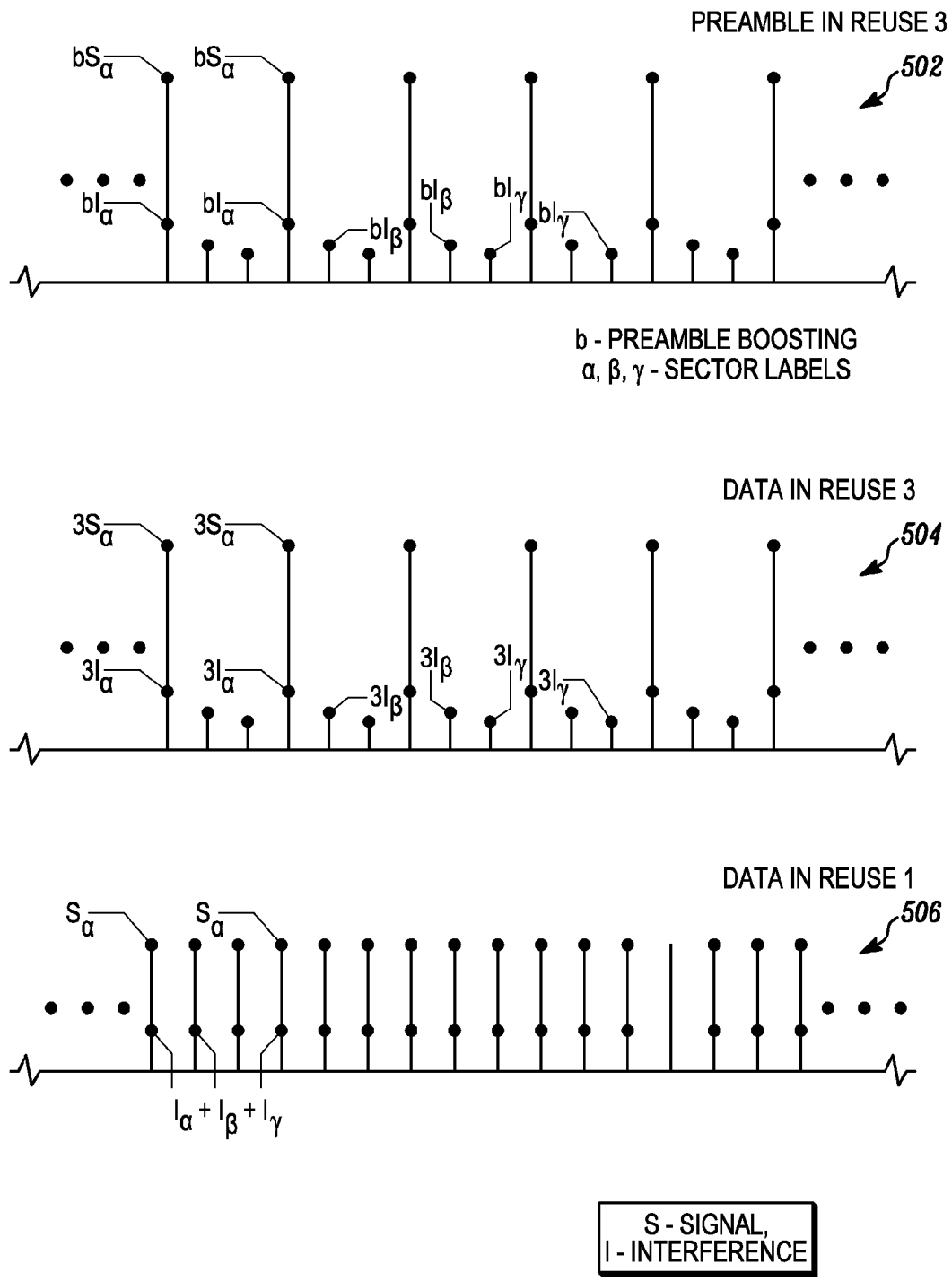
FIG. 5 is an example diagram depicting normalized power boosted signal and interference powers on each segment in a preamble signal. The corresponding normalized powers for a data zone in reuse-1 and reuse-3 are also shown.

Various embodiments of the present disclosure are directed to obtaining preamble-based measurements required by an IEEE 802.16e compliant mobile station (MS). It should, however, be appreciated that the techniques disclosed herein are broadly applicable to estimating received signal strengths and an associated carrier to interference and noise ratio (CINR) at a subscriber station (SS) in a wireless network in general. ILEE 802.16e requires that CINR measurements made from the boosted preamble be transformed to reflect the average CINR on non-boosted data subcarriers (i.e., a CINR of a hypothetical data zone) assuming one of the two possible reuse types: i.e., reuse-1 type and reuse-3 type. In the reuse-3 type deployments (see FIG. 5 diagram 504), any given base station (BS) transmits on a single segment, which corresponds to one-third of an available bandwidth (i.e., the set of usable subcarriers in each OFDMA symbol in a data zone is divided into three segments). Note that there is a difference to conventional reuse-3 where three (3) RF channels are assigned to three sectors each of which has full access to all the subcarriers in the assigned RF channel. However in the reuse-3 deployment here, one RF channel is shared among three sectors via using different subsets of subcarriers.

In a reuse-1 type deployments (see FIG. 5 diagram 506), all transmitting BSs share the available usable subcarriers. For example, a channel having a bandwidth of 10 MHz may include 1024 subcarriers (in one IEEE802.16e case the 1024 subcarriers include 173 guard subcarriers (on each of two edges) and 851 usable subcarriers, which are further partitioned into 768 data subcarriers and 83 pilot subcarriers). Irrespective of whether the reuse-1 type or the reuse-3 type are employed for data transmission, a preamble signal transmitted by a given BS only occupies a third of the entire band because the preamble signal occupies every third subcarrier (i.e., the subcarriers are uniformly spaced every three subcarriers—see FIG. 5 diagram 502). In other words, the preamble of a given BS is always transmitted in a particular reuse-3 type in an IEEE 802.16e compliant wireless network.

According to one embodiment of the present disclosure, a technique for determining a received signal strength indicator of a target base station at a subscriber station includes performing a discrete Fourier transform on a received signal to provide a transformed signal. In this case, the transformed signal occupies one or more segments of a channel and the one or more segments each include multiple subcarriers. A shift-n (e.g., shift-one) cross-correlation is calculated based on the transformed signal and a preamble sequence of the target base station to provide a coarse received signal strength indicator for the target base station.

According to another embodiment of the present disclosure, a technique for determining a carrier to interference and noise ratio of a target base station at a subscriber station includes performing a discrete Fourier transform on a received signal to provide a transformed signal. In this case, the transformed signal occupies one or more segments of a channel and the one or more segments each include multiple subcarriers. A received signal strength indicator is calculated for the target base station based on a shift-one cross-correlation of the transformed signal and a preamble sequence of the target base station. Received signal strength indicators are calculated for one or more interferer base stations on the one or more segments based on a shift-one cross-correlation of the transformed signal and preamble sequences of the one or more interferer base stations. A noise power estimate is determined from a single one of the one or more segments. Finally, a carrier to interference and noise ratio is determined for the target base station, based on the received signal strength indicators for the target base station and the one or more interferer base stations and the noise power estimate.

According to another aspect of the present disclosure, a communication system includes a target base station in communication with a subscriber station. The subscriber station is configured to perform a discrete Fourier transform on a received signal to provide a transformed signal. In this case, the transformed signal occupies one or more segments of a channel and the one or more segments each include multiple subcarriers. The subscriber station is also configure to calculate a shift-n cross-correlation based on the transformed signal and a preamble sequence of the target base station to provide a coarse received signal strength indicator for the target base station.

With reference to FIG. 1, an example wireless communication network 100 includes a mobile station (MS), also referred to as subscriber station (SS) 104, that is configured to communicate with another device (not shown) via a serving base station (BS), which at any given time may correspond to one of BSs 102, denoted as BS1, BS2, and BS3. The MS 104 may transmit/receive various information, e.g., voice, images, video, and audio, to/from various sources, e.g., another MS, or an internet-connected server. As is depicted, the BS 1102 is coupled to a mobile switching center (MSC) 106, which is coupled to a public switched telephone network (PSTN) 108. Alternatively, the network 100 may not employ the MSC 106 when voice service is based on voice over Internet protocol (VoIP) technology, where calls to the PSTN 108 are typically completed through a gateway (not shown). The BS 1102 includes a transmitter 112 and a receiver 114, both of which are coupled to a control unit 116.

The control unit 116 may be, for example, a microprocessor, a microcontroller, a programmable logic device (PLD), or an application specific integrated circuit (ASIC). Similarly, the MS 104 includes a transmitter 122 and a receiver 124 coupled to a control unit 126, which may be, for example, a microprocessor, a microcontroller, a PLD, or an ASIC. The control unit 126 may be also coupled to a display 128, e.g., a liquid crystal display (LCD), and an input device 130, e.g., a keypad. The BSs 102 denoted as BS2 and BS3 are constructed in a manner similar to the BS 102 denoted as BS1. As used herein the term "coupled" includes both a direct electrical connection between blocks or components and an indirect electrical connection between blocks or components achieved using intervening blocks or components. It should be appreciated that the SS 104 may receive signals from more or less than three of the BSs 102. At any given point in time, only one of the BSs 102 is a target BS and the remaining BSs are usually considered interfering BSs.

Figure 2:
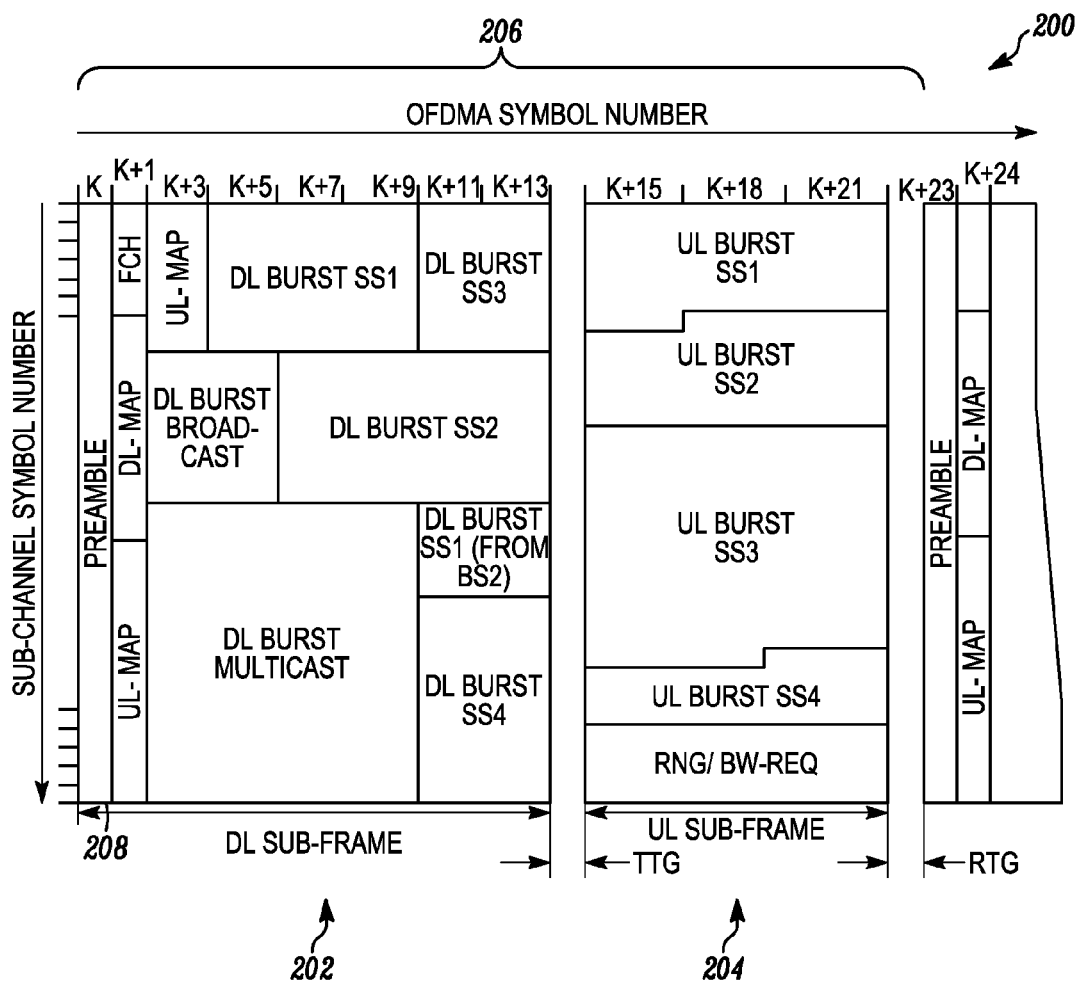
FIG. 2 is a diagram of an example time division duplex (TDD) frame for a cellular network that includes a number of orthogonal frequency division multiple access (OFDMA) symbols.

Turning to FIG. 2, an example frame diagram 200 for an IEEE 802.16 compliant system is illustrated. A frame of this type may be used to communicate between the MS 104 and one of the BSs 102 of the communication network 100 shown in FIG. 1. A frame 206 includes a number of OFDMA symbols in a downlink (DL) sub-frame 202 and an uplink (UL) sub-frame 204. It should be appreciated that the number of OFDMA symbols in the frame 206 is dependent upon the frame duration and the symbol duration. For example, a frame having a 5 mS duration may include 48 OFDMA symbols per frame in one of the IEEE 802.16 compliant configurations. In any case, each of the OFDMA symbols includes an equal number of subcarriers. As is depicted, a preamble 208 occupies a first OFDMA symbol of each frame. Note that in IEEE802.16, a preamble signal occupies only every third subcarriers.

Conformance requirements on CINR measurement accuracy are typically defined by the standard employed. For example, IEEE 802.16 specifies a CINR measurement accuracy of +/−2 decibel (dB) for absolute error, and +/−1 dB for relative error. The accuracy requirement applies to a range of CINR values specified as follows: "[t]he specified accuracy shall apply to the range of CINR values starting from 3 dB below the SNR of the most robust rate, to 10 dB above the SNR of the least robust rate" (802.16e-2005, 28 Feb., 2006, Pg 640). The implication of the preceding statement is that for a relatively wide range, such as 2 dB to 30 dB, the CINR is required to satisfy the accuracy requirement. In addition to providing an accurate CINR estimate for the serving BS, it is desirable for a MS to be configured to perform autonomous cell scanning by monitoring RSSIs/CINRs of other active BSs for possible handover initiation. As used herein the term "handover" is used to indicate when a particular MS changes BSs.

As noted above, a preamble signal of an IEEE 802.16 compliant BS is transmitted in the reuse-3 type i.e., it occupies a third of the available subcarriers. Assuming that a target BS is transmitting on a first segment (e.g., segment zero), a received signal on all three segments in a preamble signal, after a discrete Fourier transform (DFT) operation (i.e., transformed signal), may be represented in the frequency domain as:

$$Y_{3k} = \sqrt{B_p} \, H_{3k} P_{3k} + \sqrt{B_p} \sum_{i \in A_j} z_{3k}^{(i)} + v_{3k} \quad (1)$$

$$Y_{3k+1} = \sqrt{B_p} \sum_{i \in A_{j+1}} z_{3k+1}^{(i)} + v_{3k+1}$$

$$Y_{3k+2} = \sqrt{B_p} \sum_{i \in A_{j+2}} z_{3k+2}^{(i)} + v_{3k+2}$$

$$k = 0, 1, \ldots (N_p/3) - 1$$

where $N_p$ is the number of subcarriers spanned by the preamble (e.g., 851 for FFT-1024 in IEEE 802.16e), k is the index to each element of a preamble sequence, $H_{3k}$ is the channel gain (channel frequency response) where the factor "3" in the subscript denotes the fact that preamble sequences are one every third subcarriers only, $P_{3k} \in \{-1, +1\}$ is the transmitted preamble symbol for binary phase shift keying (BPSK) modulation, $z_{3k}^{(i)}$ is the received signal from interferer i, $v_{3k}$ is the noise variance, $A_j$ is the set of all interferers on segment j, and $B_p$ is the preamble power boosting factor with respect to average power at data subcarriers, which is eight in the IEEE 802.16e example (i.e., each preamble symbol is sent at 8 times more power than the average power per data subcarrier).

RSSI and CINR Definitions

The RSSI of a target BS can be defined as the received signal from only the target BS of interest, i.e., without interference or white noise power, and the RSSI on the preamble is given by (assuming target BS is on segment i):

$$RSSI_d = \sum_{k=0}^{N_p-1} |H_k^P|^2 = \sum_{k=0}^{N_p/3-1} |H_{3k+i}^P|^2 \quad (2)$$

where $H_k^P$ is the power-boosted channel on the preamble. The CINR is defined as the ratio between the target BS RSSI and the sum of the RSSIs of all interfering BSs plus white noise power with appropriate boosting power adjustment. It should be appreciated that a CINR depends on the set of BSs that should be treated as interferers. For example, in a reuse-3 type deployment each of three sectors of a cell uses non-overlapping frequency channels (e.g., a non-overlapping set of OFDM subcarriers), while in a reuse-1 type deployment all sectors use the same channel. In IEEE 802.16, the preamble signal is always sent on every third subcarrier, while the data signal can be transmitted in either reuse-3 type or reuse-1 type. The definitions on signal power and the interference power depend on the reuse type and the zone type (preamble/data zone). For reuse 1, the normalized (i.e., per-subcarrier)

signal and interference powers measured on the preamble and data zone are given by, respectively $$S_{reuse-1} \equiv \frac{1}{N_p} \sum_{k=0}^{N_p-1} |H^P_{3k}|^2 \quad (3)$$

$$= \frac{B_p}{N_p} \sum_{k=0}^{N_p/3-1} |H_{3k}|^2$$

$$= \frac{RSSI_d}{N_p}$$

$$I_{reuse-1} \equiv \frac{B_p}{N_p} \sum_{k=0}^{N_p/3-1} \left[ \sum_{i \in A0} |z^{(i)}_{3k}|^2 + \sum_{i \in A1} |z^{(i)}_{3k+1}|^2 + \sum_{i \in A2} |z^{(i)}_{3k+2}|^2 \right]$$

$$= \frac{\sum_{j=0,1,2} \sum_{l \in A_j} RSSI_l}{N_p}$$

$$S_{data,1} = \frac{1}{N_d} \sum_{k=0}^{N_d-1} |H_k|^2$$

$$\approx \frac{3}{B_p} S_{reuse-1}$$

$$= \frac{3 RSSI_d}{B_p N_p}$$

$$I_{data,1} = \frac{1}{N_d} \sum_{k=0}^{N_d-1} \sum_{i \in A} |z^{(i)}_k|^2$$

$$\approx \frac{3}{B_p} I_{reuse-1}$$

$$= \frac{3 \sum_{j=0,1,2} \sum_{l \in A_j} RSSI_l}{B_p N_p}$$

where $N_d \approx N_p$ is the number of usable subcarriers in a data zone (including all segments) which is almost the same as the subcarrier span of the preamble signals as in (1), A, $A_j$ represent set of all interferers and the set of interferers on segment j respectively and RSSI, represents the RSSI of the an interferer. Similarly, we obtain the following relationships for reuse 3

$$S_{reuse-3} \equiv \frac{B_p}{N_p/3} \sum_{k=0}^{N_p/3-1} |H_{3k}|^2 = \frac{RSSI_d}{N_p/3} \quad (4)$$

$$I_{reuse-3} \equiv \frac{B_p}{N_p/3} \sum_{k=0}^{N_p/3-1} \sum_{i \in A0} |z^{(i)}_{3k}|^2 = \frac{\sum_{l \in A_j} RSSI_l}{N_p/3}$$

$$S_{data,3} = \frac{3}{N_d} \sum_{k=0}^{N_d-1} |H_k|^2 \approx \frac{3}{B_p} S_{reuse-3} = \frac{3 RSSI_d}{B_p (N_p/3)}$$

$$I_{data,3} = \frac{3}{N_d} \sum_{k=0}^{N_d-1} \sum_{i \in A} |z^{(i)}_k|^2 \approx \frac{3}{B_p} I_{reuse-3} = \frac{3 \sum_{l \in A_j} RSSI_l}{B_p (N_p/3)}$$

The additional factor of 3 boosting in a reuse-3 data zone over that of reuse-1 is due to zone boosting which is provided since reuse-3 only uses a third of subcarriers. In addition it is clear that the white/thermal noise variance per subcarrier is the same regardless of reuse type and zone type. We define the following for total noise powers $$\sigma_T^2 = N_p N_o$$

$$\sigma_S^2 = (N_p/3) N_o = \sigma_T^2/3 \quad (5)$$

where $N_o$ is the thermal noise variance per subcarrier and $\sigma_T^2$, $\sigma_S^2$ represent the total noise powers on the whole band and each segment respectively.

As noted above, a reported CINR value for IEEE 802.16e should correspond to the CINR on a data zone, i.e., averaged over data subcarrrier(for either reuse-1 type or reuse-3 type, as instructed by the BS). In a reuse-3 type deployment, only the interferer (non-serving) BSs that transmit on the same segment as the connected (serving) BS will interfere in the data zone. In this case, using the definitions in [0027], the reported CINR of the connected BS on segment j in the case of reuse-3 type is given by:

$$CINR_{reuse-3} = \frac{S_{data,3}}{I_{data,3} + N_0} \quad (6)$$

$$\approx \frac{S_{reuse-3}}{I_{reuse-3} + \frac{B_p}{3} N_0}$$

$$= \frac{RSSI_d}{\sum_{i \in A_j} RSSI_i + \frac{B_p}{3} \sigma_S^2}$$

From the above, it is evident that a boosting factor of $B_p/3$ must be applied to thermal noise to obtain CINR for the data zone.

In a reuse-1 type deployment, on the other hand, the preamble is transmitted in reuse-3 type and, as such, the CINR evaluated on a single segment does not represent the CINR in a data zone, which includes all three segments. To obtain the appropriate CINR, interference must be estimated on segments other than that of the target BS. The reported CINR of segment j in the case of reuse-1 type is given by:

$$CINR_{reuse-1} = \frac{S_{data,1}}{I_{data,1} + N_0} \quad (7)$$

$$\approx \frac{S_{reuse-1}}{I_{reuse-3} + \frac{B_p}{3} N_0}$$

$$= \frac{RSSI_d}{\sum_{i \in A0} RSSI_i + \sum_{i \in A1} RSSI_i + \sum_{i \in A2} RSSI_i + \frac{B_p}{3} \sigma_T^2}$$

RSSI Estimation

According to one or more aspects of the present disclosure, RSSIs of interferer (e.g., non-serving) BSs on each segment are estimated based on the assumption that the number of interferer BSs and their cell identifications (IDs) and associated preamble sequences are known. For the case of one active interferer, the received signal at subcarrier 'i' is given by:

$$Y_i = H_{d,i} P_{d,i} + H_{I,i} P_{I,i} + N_i \quad (8)$$

where the subscripts 'd' and 'I' represent a target (e.g., serving) BS and an interferer (e.g., non-serving) BS, respectively. Dividing the signal by the preamble of the serving BS yields:

$$Y_i/P_{d,i} = H_{d,i} + H_{I,i} P_{I,i}/P_{d,i} + N_i/P_{d,i} \quad (9)$$

Assuming that the preamble sequence of the interferer BS is uniformly random, the interference and noise components of the received signal are approximately uncorrelated in the frequency domain. This property can be used to isolate the target BS signal from the received signal. The correlation of the above signal with a shifted replica of itself at shift-one is given by:

$$B_d = \sum_{i=0}^{N_p-2} \frac{Y_i}{P_{d,i}} \frac{Y_{i+1}^*}{P_{d,i+1}} = \sum_{i=0}^{N_p-2} \left(\frac{Y_i Y_{i+1}^*}{z_i}\right)\left(\frac{1}{\frac{P_{d,i} P_{d,i+1}}{Q_{d,i}}}\right) \quad (10)$$

where $Z_i$ and $Q_{d,i}$ denotes shift-one autocorrelation of the received signal $Y_i$ (after the DFT operation) and the preamble sequence $P_{d,I}$, respectively, $B_d$ is the cross-correlation of $Z_i$ and $Q_{d,i}$ (where 4 needs to be computed only once), and $Q_{d,i}$ is a sequence of +/−1. The operation in equation (10) is denoted as a "shift-one cross-correlation" since it is a cross-correlation of $Z_i$ and $Q_{d,i}$ that are both shift-one autocorrelations. Once $Z_i$ is computed, the crude RSSIs for target BSs of interest can be obtained without any multiplications, based on equation (10). This low-complexity scanning facilitates scanning of a large number of candidate neighbor cells.

The value $B_d$ computed above is a crude or coarse RSSI estimate because the statistical mean (average) of the shift-one cross-correlation can be obtained as follows:

$$E[B_d] = E\left(\sum_{i=0}^{N_p-2} \frac{Y_i}{P_{d,i}} \frac{Y_{i+1}^*}{P_{d,i+1}}\right) \quad (11)$$

$$\approx E\left[\sum_{i=0}^{N_p-2} H_{d,i} H_{d,i+1}^*\right] + E\left[\sum_{i=0}^{N_p-2} H_{I,i} H_{I,i+1}^* \frac{P_{I,i}}{P_{d,i}} \frac{P_{I,i+1}}{P_{d,i+1}}\right] +$$

$$E\left[\sum_{i=0}^{N_p-2} H_{d,i} H_{I,i+1}^* \frac{P_{I,i+1}}{P_{d,i+1}}\right] + E\left[\sum_{i=0}^{N_p-2} H_{I,i} H_{d,i+1}^* \frac{P_{I,i}}{P_{d,i}}\right]$$

$$\approx (\rho_d RSSI_d + \rho_I RSSI_I \delta_{d,I}) \frac{N_p - 1}{N_p}$$

$$\approx (\rho_d RSSI_d + \rho_I RSSI_I \delta_{d,I})$$

where $\rho_d$ is the shift-one cross-correlation of the channel (between adjacent subcarriers) of the serving BS and $\rho_I$ is the shift-one cross-correlation of the channel of a non-serving (interferer) BS. Assuming that subcarriers of the serving BS on the segment are uncorrelated with subcarriers of the interferer BS on the segment, the third and fourth terms after the first "≈" in equation (8) are zero. The second term, on the other hand, is typically non-zero.

The crude RSSI estimate $B_d$ contains both a scaled $RSSI_d$ of the target BS and a scaled $RSSI_I$ of the interferer BS. The second term of equation (8) indicates that the RSSI of the interferer BS contributes to $B_d$ with a scaling factor that depends on the cross-correlation of the shift-one autocorrelation of the target BS preamble and the shift-one autocorrelation of the interferer BS preamble, which may be written as:

$$\delta_{d,I} = \frac{1}{N_p - 1} \sum_{i=0}^{N_p-1} \frac{P_{I,i}}{P_{d,i}} \frac{P_{I,i+1}}{P_{d,i+1}} \quad (12)$$

Typically, the cross-correlation of equation (9) is not zero even though it may have a relatively small value, especially when the preamble sequences are very long. Typical values the scaling factor for an IEEE 802.16e preamble sequences can be as high as 0.15.

In order to improve the RSSI estimate from the crude RSSI, one can attempt to remove $RSSI_I$ from $B_d$. In order to attempt to remove $RSSI_I$ from $B_d$, it is noted that, similar to equation (8), the RSSI of the interferer can be derived as:

$$B_I = E\left(\sum_{i=0}^{N_p-2} \frac{Y_i}{P_{I,i}} \frac{Y_{i+1}^*}{P_{I,i+1}}\right) \approx (\rho_d \delta_{d,I} RSSI_d + \rho_I RSSI_I) \quad (13)$$

Assuming correlation between adjacent subcarriers of the channel, $|\rho_d|=|\rho_I|=1$, the true estimates for the RSSIs may be calculated as follows, after formulating the problem as solving both $RSSI_d$ and $RSSI_I$ from equations (10) and (11) simultaneously:

$$RSSI_{d,est} = \left|\frac{(B_d - \delta_{d,I} B_I)}{(1 - \delta_{d,I}^2)}\right| \quad (14)$$

$$RSSI_{I,est} = \left|\frac{(B_I - \delta_{d,I} B_d)}{(1 - \delta_{d,I}^2)}\right|$$

It should be appreciated that the estimates require knowledge of the preamble sequence of the serving BS and the interferer BS, i.e., known $\delta_{d,I}$.

The previous derivation assumes one target and one interferer BS. For the case of two active interferer BSs on the same segment as the serving BS, the received signal on subcarrier 'i' can be represented as:

$$Y_i = H_{d,i} P_{d,i} + H_{I_1,i} P_{I_1,i} + H_{I_2,i} P_{I_2,i} + N_i \quad (15)$$

The shift-one cross-correlations for the target BS and the interferer BSs are given by the following equation:

$$\underbrace{\begin{bmatrix} B_d \\ B_{I_1} \\ B_{I_2} \end{bmatrix}}_{B} \approx \underbrace{\begin{pmatrix} 1 & \delta_{d,I_1} & \delta_{d,I_2} \\ \delta_{d,I_1} & 1 & \delta_{I_1,I_2} \\ \delta_{s,I_2} & \delta_{I_1,I_2} & 1 \end{pmatrix}}_{\delta} \underbrace{\begin{pmatrix} \rho_d RSSI_d \\ \rho_{I_1} RSSI_{I_1} \\ \rho_{I_2} RSSI_{I_2} \end{pmatrix}}_{R} \quad (16)$$

The RSSI estimates can then be obtained as:

$$\hat{R} = |\delta^{-1} B| \quad (17)$$

and the inverse matrix can be approximated by a symmetric matrix $$\begin{pmatrix} 1 & a & b \\ a & 1 & c \\ b & c & 1 \end{pmatrix}^{-1} = \begin{pmatrix} 1-c^2 & bc-a & ac-b \\ bc-a & 1-b^2 & ab-c \\ ac-b & ab-c & 1-a^2 \end{pmatrix} \quad (18)$$

for $a$, $b$, and $c \ll 1$.

In general, more than two interfering BSs are present, and similar equations can be setup as above with increasing matrix dimensions. To limit the complexity of deriving RSSI estimates, the crude RSSI estimates can be used to select the two most dominant interferers and the approach set forth in paragraph [0036] may then be followed.

In an other embodiment, the above mentioned approach can also be used with a shift-n correlation as follows $$B_d = \sum_{i=0}^{N_p-2-n} \frac{Y_i}{P_{d,i}} \frac{Y_{i+n}^*}{P_{d,i+n}} \quad (19)$$

In another embodiment, the above mentioned approach with shift-n correlation can be performed only over a set of subcarriers.

$$B_d = \sum_{i \in [0,2,N_p-2-n]} \frac{Y_i}{P_{d,i}} \frac{Y_{i+n}^*}{P_{d,i+n}} \quad (20)$$

It should also be understood, that sums of a mixture of different shift correlations can be used to arrive at a crude RSSI estimate. This, for example, is applicable when the preamble subcarriers (or in general any pilot subcarriers) are non-uniformly spaced, as opposed to uniform spacing of 3 subcarriers in a 802.16-compliant preamble. In this case, the corresponding compensation factors as in (12), can be derived by using appropriately weighted sums of corresponding shift correlations of the preamble sequences.

Frame Averaging of Estimates

The above derived crude estimates of RSSI can be improved (to more closely correspond to approximation in equation (11) for accurate compensation) by averaging the estimates over multiple frames. The shift-one cross-correlations $B_k$ at a frame j can be recursively averaged as follows:

$$B_{avg,k,j-1} = (1 - \alpha_R) B_{avg,k,j-1} + \alpha_R B_{k,j} \quad j > 1, \quad k = d, I_1, I_2 \quad (21)$$
$$= B_{k,1} \quad j = 1, \quad k = d, I_1, I_2$$

where $0 < \alpha_R < 1$. The frame-averaged and compensated RSSI estimates (assuming the two-interferer case here) on a frame j can be obtained as:

$$\hat{R}_{avg,j} = |\delta^{-1} B_{avg,j}| \quad (22)$$

where $B_{avg,j} = [B_{avg,j,d}, B_{avg,j,I_1}, B_{avg,j,I_2}]^T$ is a vector of the shift-one cross-correlations of the three known BSs on a segment. If the segment contains the serving BS, then this list should include the serving BS.

White Noise Variance (Power) Estimation

In an IEEE 802.16e compliant system, combined I+N$_o$ (interference plus noise) estimates cannot generally be used to obtain accurate CINR estimates of a data zone, because the preamble is power boosted relative to data but noise is not boosted. As such, an estimate of noise power alone is desirable, as denoted by "N$_0$" in equations (6) and (7). According to various aspects of the present disclosure, an estimate of white noise variance (i.e., white noise power) is derived based on RSSI estimates for the serving BS and the interferer BS. The instantaneous total received power of a preamble can be defined as:

$$\hat{P}_{inst,j} = \sum_{i=1}^{N_p} |Y_{j,i}|^2 \quad (23)$$

where $Y_{j,i}$ is the received signal on preamble subcarrier 'i' in frame 'j' (preamble subcarriers are every third subcarriers in the IEEE802.16e example). The instantaneous total power $\hat{P}_{inst,j}$ is an estimate of the sum of the powers of the target BS, interferer BSs on the same segment, and the noise. Frame-averaged total power on a segment j can be obtained as:

$$\hat{P}_{avg,j} = (1 - \alpha_R) \hat{P}_{avg,j-1} + \alpha_R \hat{P}_{inst,j} \quad j > 1 \quad (24)$$
$$= \hat{P}_{inst,1} \quad j = 1$$

A white noise variance (white noise power) estimate on a segment can be obtained by subtracting the frame-averaged RSSI estimates (including all interferers on that segment) from the frame-averaged total power estimate on the segment as follows:

$$\hat{\sigma}_{inst,j}^2 = \hat{P}_{avg,j} - \sum_{k=1}^{N_I} \hat{R}_{avg,j}(k) \quad (25)$$

where $N_I$ is the number of interferers, e.g., three interferers. Since white noise power varies at a much slower rate than RSSI, further averaging of the noise variance can be performed as follows:

$$\hat{\sigma}_{avg,j}^2 = (1 - \alpha_T) \hat{\sigma}_{avg,j-1}^2 + \alpha_T \hat{\sigma}_{inst,j}^2 \quad j > 1 \quad (26)$$
$$= \hat{\sigma}_{inst,1}^2 \quad j = 1$$

where $\alpha_T \ll \alpha_R$. The averaged noise variance estimate is then given by:

$$\hat{\sigma}_{avg,j}^2 = |\hat{\sigma}_{avg,j}^2| \quad (27)$$

According to one or more embodiments of the present disclosure, one can choose any one of the three segment to estimate the noise variance. To improve noise power estimates, the noise power estimates may be obtained from the segment with the lowest estimated frame-averaged total power, $\hat{P}_{avg}$, i.e set $\hat{\sigma}_S^2 = \hat{\sigma}_{avg,j}^2$, where segment j has minimum total power.

The noise estimate usually includes a positive bias, which results from the assumption that the correlation of channels on adjacent subcarrier is $|\rho|=1$. The bias when three interferers are present may be given by:

$$E[\hat{\sigma}_{inst,j}^2] - E[\sigma^2] = E\left[\hat{P}_{avg,j} - \sum_{k=1}^{N_I} \hat{R}(k)\right] - E[\sigma^2] \quad (28)$$
$$= (S + I_1 + I_2 + I_3)(1 - |\rho|)$$

The over-estimation of the noise power (i.e., positive bias), which increases in absolute value with signal-to-noise ratio (SNR), makes the final CINR smaller than the true value. It is expected that the noise power bias will distort the CINR more in a noise limited case, i.e., when the noise power dominates the interference power $\Sigma_{I \in A_j} RSSI_{I,est} \geq \sigma^2$. But the CINR distortion due to noise power bias is negligible in an interference-limited scenario.

After all RSSIs and noise power are estimated, the final physical CINR for a reuse-3 type scenario is given by, according to equation (6):

$$CINR_{est} = \frac{\hat{S}}{\hat{I} + \frac{8}{3}\hat{\sigma}^2} \quad (29)$$

where $\hat{S}$ is equal to $RSSI_{d,est}$ and $\hat{I}$ is equal to $\Sigma_{I \in As} RSSI_{I,est}$. Similarly, the CINR for reuse-1 type scenario can be computed according to equation (7).

Detection of Inferior (Non-Serving) Base Stations

The above calculations are based on the assumption that the receiver has perfect knowledge of the number of active interferers and their cell IDs. According to another aspect of the present disclosure, interferers are detected before estimating their signal strength. In the absence of knowledge of the interferers, a shift-one cross-correlation may be evaluated for every cell ID according to:

$$B_k = E\left(\sum_{i=0}^{N_p-1} \frac{Y_i}{P_{k,i}} \frac{Y_{i+1}^*}{P_{k,i+1}}\right) \approx \sum_{q \neq k} \rho_q \delta_{k,q} RSSI_q + \rho_k RSSI_k, \quad (30)$$

$$k = 1, 2, \ldots 38$$

where k is the number of preamble IDs (in the IEEE 802.16 example there are thirty-eight preambles defined for each segment). A frame average can then be obtained as follows:

$$B_{avg,k,j-1} = (1 - \alpha_R) B_{avg,k,j-1} + \alpha_k B_{k,j} \quad j > 1, \quad k = 1, 2, \ldots 38 \quad (31)$$

$$= B_{k,1} \quad j = 1, \quad k = 1, 2, \ldots 38$$

In theory, RSSIs for BSs (e.g., thirty-eight BSs), whether they are actually present or not, can be estimated from an equal number of equations formed according to equation (26). However, it is computationally expensive to solve for that many unknown variables due to the matrix inversion of a 38-by-38 matrix, in this case. Approximations for the inverse can be used taking advantage of smaller non-diagonal entries in the matrix, similar to equation (16), which would still require additional multiplications. Moreover, only a few significant interferers are usually detected by an MS on each segment. A number of different approaches can be followed to detect interferers. For example, a first approach detects the interferers on each segment from the rough RSSI estimate of $B_k$, based on, for example, either an absolute threshold or a relative threshold defined as the ratio to the strongest BS in that segment (i.e., $\max(B_k)$). A second approach always estimates the RSSIs for three BSs according to the ranking in $B_k$. In the case where there are fewer BSs than three, the RSSI of the "absent" BS is typically very small (discussed in greater detail below).

If the second approach is used, at each frame j, the three most dominant interferers may be chosen to be the preamble indices corresponding to the three largest values of $|B_{avg,k,j-1}|$. In this case, the cell indices are denoted as $d_1$, $d_2$, and $d_3$ and the frame average is:

$$B_{avg,j}^d = [B_{avg,d1,j}, B_{avg,d2,j}, B_{avg,d3,j}]^T \quad (32)$$

The RSSI estimates of detected indices are then given by:

$$\hat{R}_{avg,j}^d = (\delta_j^d)^{-1} B_{avg,j}^d \quad (33)$$

where $\delta_j^d$ is the shift-one cross-correlation matrix of preambles for the detected interferers in frame j. The RSSIs of the non-dominant cell indices are then approximated to be zero.

Estimate Bias Due to Detection Errors

Due to non-zero cross-correlations between the shift-one autocorrelation of the preamble of serving and non-serving BSs, there is a chance of false alarms and missed detection, i.e., false positives of detecting an inactive interferer and false negatives of not detecting an active interferer. This is due, at least in part, to the fact that the detection itself is based on uncompensated RSSIs, and may occur if a stronger base signal has a larger correlation (higher value of delta) to an inactive BS as opposed to an active BS. Compensation as in equations (11) and (18) before detection, though optimal, may not be feasible due to computational effort required for obtaining the inverse of a larger δ matrix. If a smaller set of active BS indices is available, e.g., from a neighbor list update provided by the serving BS, compensation before detection may be feasible. For the purposes of handover, the impact of false alarms is usually acceptable, since the BSs that are falsely detected are often associated with small RSSI values and the strongest BS that is more likely to be a true handover target may be detected reliably. However, for accurate CINR estimation, detection and estimation of more than one BS (e.g., a serving BS and a non-serving BS) is usually desirable. In the case that the non-serving BS signals are weak, even the strongest interferer BS detection may be a false alarm if a preamble of an inactive interferer has a larger correlation to a preamble of the true strongest interferer BS.

False alarms may also occur when there are fewer interferers than the pre-determined number to be detected. For example, if three interferers are to be detected every frame as programmed, false positives occur when there are actually fewer than three interferers. A false alarm usually results in over-estimation of interference power and under-estimation of white noise power resulting in a CINR estimation bias. I should be noted that even with false alarms, the RSSI of an inactive but falsely detected interferer will be estimated to be close to zero, after compensation and frame averaging. However, with per frame estimate of RSSI, the values of the shift-one cross-correlations of the received signal may not converge to their ergodic (i.e., representative or typical) values for compensation to be effective and, hence, a bias may result.

In the case of a missed detection, which is the opposite of a false alarm, a bias may also result. For example, when $RSSI_d \delta_{d,p} > RSSI_d \delta_{d,q} + RSSI_q$ (where d is the dominant signal index, q is the preamble ID for an active BS index, and p is for an inactive BS index), BS p gets detected. However, after compensation, the RSSI of the inactive BS will be estimated to be the true zero value with averaging. Unfortunately, the RSSI corresponding to preamble ID q will also be approximated to zero as it is not detected. In this case, interference power is under-estimated and noise power is over-estimated. Further, missed detection typically occurs at high SNRs in an interference limited network scenario and only for certain combinations of cell IDs of target and interfering BSs. This bias can be reduced by increasing the number of detected interferers and employing compensation with higher complexity, or using an alternate approach for (I+No) estimation as is discussed in further detail below.

Alternative Method for $I+N_0$ Estimation in Interference-Limited Scenarios

On the segment with the target BS,, the estimation of $I+N_o$, which is normalized per subcarrier interference and noise power can be obtained by summing the estimated RSSIs of all interferers and the estimated white noise power $\hat{\sigma}_s^2$, An alternative method is to determine directly the combined $I+N_0$ estimate. Unlike the estimation of white noise power $N_0$, the estimation of $I+N_o$, is performed by subtracting from the total received signal only the contribution of the target BS obtained by channel estimation. The result is further compensated as explained below. In interference-limited scenarios, this alternative method for determining interference and noise power may be more accurate. It is found in interference-limited scenarios without frame-averaging, the CINR cumulative distribution function (CDF) spread around the true CINR may be about +/−4 dB with the original method. This is due, at least in part, to larger spread in the estimation error of weaker RSSIs, which results from insufficient averaging in a single frame. The estimate can be improved by detecting an interference-limited scenario and then using an I+N$_o$ estimate from the alternative method, which is essentially the estimate of interference in this scenario, as the interference dominates.

Channel estimation to a target BS may be determined in a number of ways. After a discrete Fourier transform (DFT) operation at a receiver, a received signal (e.g., provided by one target BS and one interferer BS) may be represented in the frequency domain as:

$$Y_i = H_{d,i} P_{d,i} + H_{I,i} P_{I,i} + N_i \quad (34)$$

where $Y_i$ is a received signal on active subcarrier 'i', $H_{d,i}$ is a channel gain of a target BS on subcarrier 'i', $P_{d,i}$ is a transmitted preamble symbol of the target BS on subcarrier 'i' (assumed unit magnitude per active preamble subcarrier), $H_{I,i}$ is a channel gain of an interfering BS on subcarrier 'i', $P_{I,i}$ is a preamble symbol of an interfering BS on subcarrier 'i', and $N_i$ is an additive white Gaussian noise (AWCJN) of variance $\sigma^2$ on subcarrier 'i'. A least squares (LS) channel estimate for the received signal is given by:

$$\hat{H}_i = H_{d,i} + (H_{I,i} P_{I,i} + N_i)/P_{d,i} \quad (35)$$

A minimum mean squared error (MMSE) channel estimate, can be obtained by linearly combining the LS channel estimates according to:

$$\tilde{H}_i = w^H \hat{H}_i \quad (36)$$

where w is the MMSE combining weight vector and $\hat{H}_i$ is a vector of adjacent LS channel estimates that are combined to obtain the MMSE channel estimate at active subcarrier i. We then have $$\frac{1}{N_{sc}} \sum_{i=1}^{N_{sc}} |Y_i - \tilde{H}_i P_i|^2 = \frac{1}{N_{sc}} \sum_{i=1}^{N_{sc}} \left| H_i P_i + H_{Ii} P_{Ii} + N_i - \sum_k w_k \frac{Y_k}{P_k} P_i \right|^2 \quad (37)$$

$$= \frac{1}{N_{sc}} \sum_{i=1}^{N_{sc}} \left| H_i P_i + H_{Ii} P_{Ii} + N_i - \sum_k w_k \frac{H_k P_k + H_{Ik} P_{Ik} + N_k}{P_k} P_i \right|^2$$

$$= \frac{1}{N_{sc}} \sum_{i=1}^{N_{sc}} \left| H_i P_i - \sum_k w_k H_k P_i + H_{Ii} P_{Ii} + N_i - \sum_k w_k \frac{H_{Ik} P_{Ik} + N_k}{P_k} P_i \right|^2$$

$$= \frac{1}{N_{sc}} \sum_{i=1}^{N_{sc}} \left| H_i - \sum_k w_k H_k \right|^2 + \frac{1}{N_{sc}} \sum_{i=1}^{N_{sc}} \left| H_{Ii} P_{Ii} - \sum_k w_k \frac{H_{Ik} P_{Ik}}{P_k} P_i \right|^2 + \frac{1}{N_{sc}} \sum_{i=1}^{N_{sc}} |N_i(1 - w_i) -$$

$$\sum_{k \neq i} w_k \frac{N_k}{P_k} P_i \Big|^2$$

$$\approx MSE + \frac{1}{N_{sc}} \sum_{i=1}^{N_{sc}} \Big| H_{Ii} P_{Ii}(1 - w_i) - \sum_{k \neq i} w_k \frac{H_{Ik} P_{Ik}}{P_k} P_i \Big|^2 + \sigma^2 \Big( (1 - w_i)^2 + \sum_{k \neq i} |w_k|^2 \Big)$$

$$= MSE + \frac{1}{N_{sc}} (I + N_b) \Big( (1 - w_i)^2 + \sum_{k \neq i} |w_k|^2 \Big)$$

where MSE is the asymptotic (noise-free) mean-squared error in the MMSE channel estimation and $N_{sc} = N_p/3$ is number of subcarriers in a segment.

Ignoring the MSE term, which is typically very small with appropriate filter coefficient computation, yields I+N$_0$ as:

$$(I + N_o)_{d,est} = \frac{1}{\gamma} \left( \frac{1}{N_{sc}} \sum_{i=1}^{N_{sc}} |Y_i - \tilde{H}_i P_i|^2 \right) \quad (38)$$

where $$\gamma = (1 - w_0)^2 + \sum_{k \neq 0} |w_k|^2$$

is the compensation factor. The total interference and noise power on the segment is just given by multiplying the above normalized estimate by the number of subcarriers in a segment.

$$\hat{\sigma}_{d(I+N)}^2 = (N_p/3)(I + N_o)_{d,est} \quad (39)$$

It should be noted that the presence of the MSE term gives a biased estimate of noise variance. Furthermore, the MMSE channel estimation filter coefficients (i.e., w) are typically obtained under an assumed CINR value. If the actual (I+N$_0$) variance is significantly different from the assumed value, the MSE term can have a significant contribution due to filter mismatch. However, a coarse estimate of (I+N$_0$) obtained from correlation method can be used to compute filter coefficients and reduce the MSE term, such that bias is negligible. A channel estimation filter noise variance can be set from the estimate obtained by adding interfering RSSIs on the segment and white noise variance, which is set forth below:

$$\sigma_d^2 = \frac{\left( \sum_{I \in A_0} RSSI_I + \hat{\sigma}_{avg}^2 \right)}{(N_p/3)} \quad (40)$$

CINR estimation can be improved by minimizing the biases described above, if interference or noise limited scenarios are detected. With this detection, appropriate estimates for interference and noise power can be used to derive CINR estimates in reuse-1 and reuse-3 type cases. Specific examples are discussed in further detail below.

CINR Computation After Detection Of Noise- And Interference-Limited Scenarios

In the example below for reuse-3 type, the following criterion is used to determine whether a system is noise-limited or interference-limited:

$$\Sigma_{I \in As} RSSI_{I,est} < \hat{\sigma}_s^2 \Rightarrow \text{Interference Limited Flag} = 1 \quad (41)$$

It should be appreciated that other criteria or modified thresholds for interference to noise ratio may be used to distinguish between noise-limited and interference-limited scenarios. In a preferred embodiment of the invention, the interference-limited boost-compensated CINR estimate for reuse-3 type may be derived by:

$$CINR_{est} = \frac{RSSI_{d,est}}{\hat{\sigma}^2_{d(I+N)} + (5/3)\hat{\sigma}^2_s} \quad (42)$$

in which a combined estimate of interference and noise power obtained from channel estimation ([0061]) on the segment with target BS is used.

In the noise-limited case, the boost-compensated CINR estimate for segment j may be derived by:

$$CINR_{est} = \frac{RSSI_{d,est}}{\sum_{l \in A_j} RSSI_l + (8/3)\hat{\sigma}^2_s} \quad (43)$$

In the example below for reuse-1 type, the following criterion is used to determine whether a reuse-i type system is noise-limited or interference-limited:

$$\Sigma_{I \in A0} RSSI_{I,est} + \Sigma_{I \in A1} RSSI_{I,est} + \Sigma_{I \in A2} RSSI_{I,est} > \hat{\sigma}_T^2 = 3\hat{\sigma}_s^2$$
$$\Rightarrow \text{Interference Limted Flag} = 1 \quad (44)$$

The interference-limited boost-compensated CINR estimate for reuse-1 type may be derived by:

$$CINR_{est} = \frac{RSSI_{d,est}}{\sigma^2_{d,(I+N)} + \hat{P}_{avg,1} + \hat{P}_{avg,2} + \frac{5}{3}\hat{\sigma}^2_T} \quad (45)$$

In the denominator of the above equation $\Sigma_{I \in Aj} RSSI_I + \hat{\sigma}_s^2$ or $\hat{P}_{avg,j}$ can be interchangeably used, but using the latter results in more accurate estimates. Similarly, the noise-limited boost-compensated CINR estimates for reuse-1 type may be derived by:

$$CINR_{est} = \frac{RSSI_{d,est}}{\sum_{I \in A0} RSSI_I + \hat{\sigma}^2_S + \hat{P}_{avg,1} + \hat{P}_{avg,2} + \frac{5}{3}\hat{\sigma}^2_T} \quad (46)$$
$$= \frac{RSSI_{d,est}}{\sum_{I \in A0} RSSI_I + \hat{P}_{avg,1} + \hat{P}_{avg,2} + 2\hat{\sigma}^2_T}$$

As mentioned above, false alarms result in biased estimation of noise variance. However, in interference-limited systems, the bias introduced in CINR estimates, due to error in noise estimation, is small or negligible.

Figure 3:
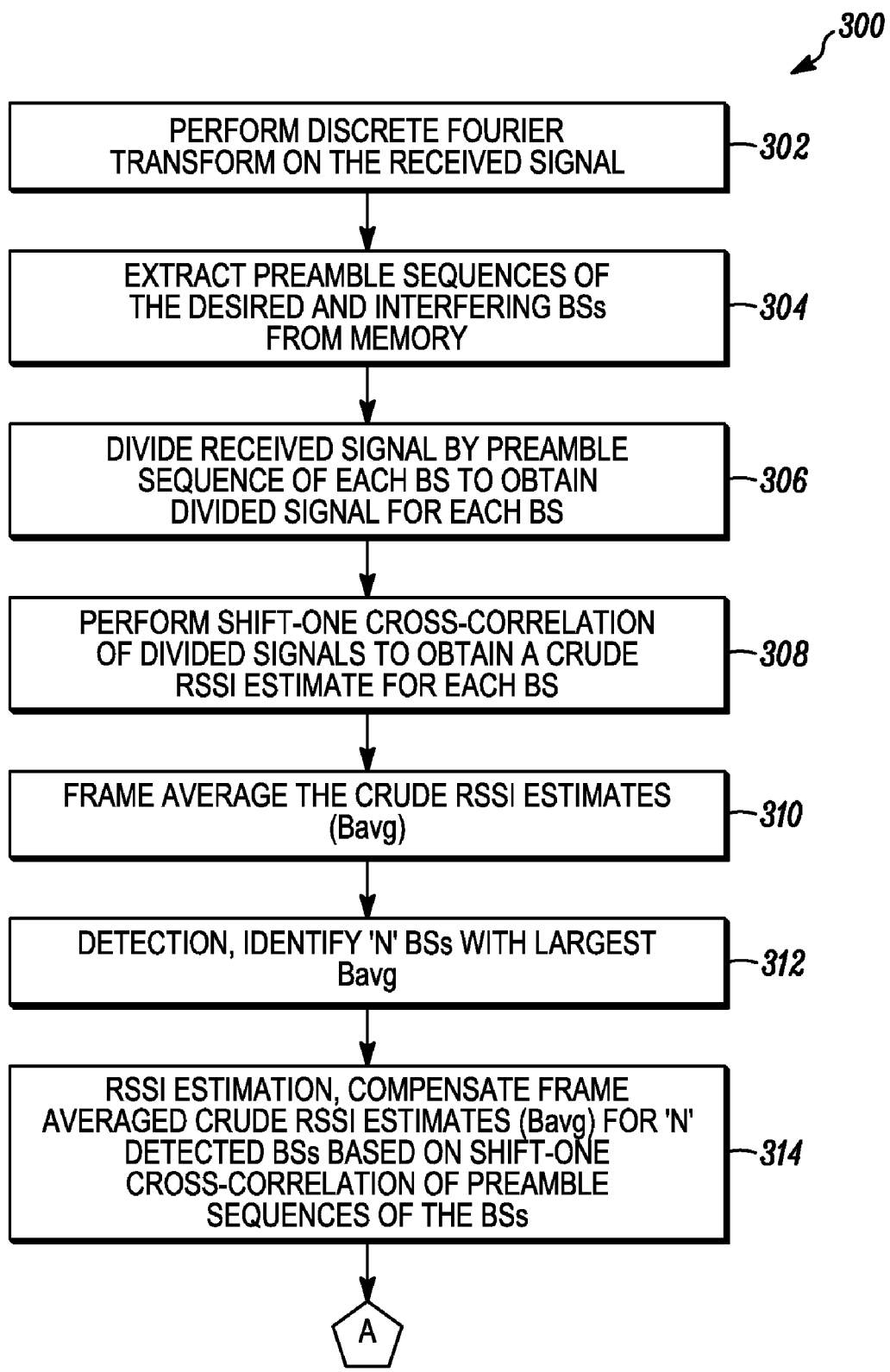
FIGS. 3-4 depict an example flow diagram of a technique for estimating received signal strength indicators and carrier to interference and noise ratio, according to an embodiment of the present disclosure.
Figure 4:
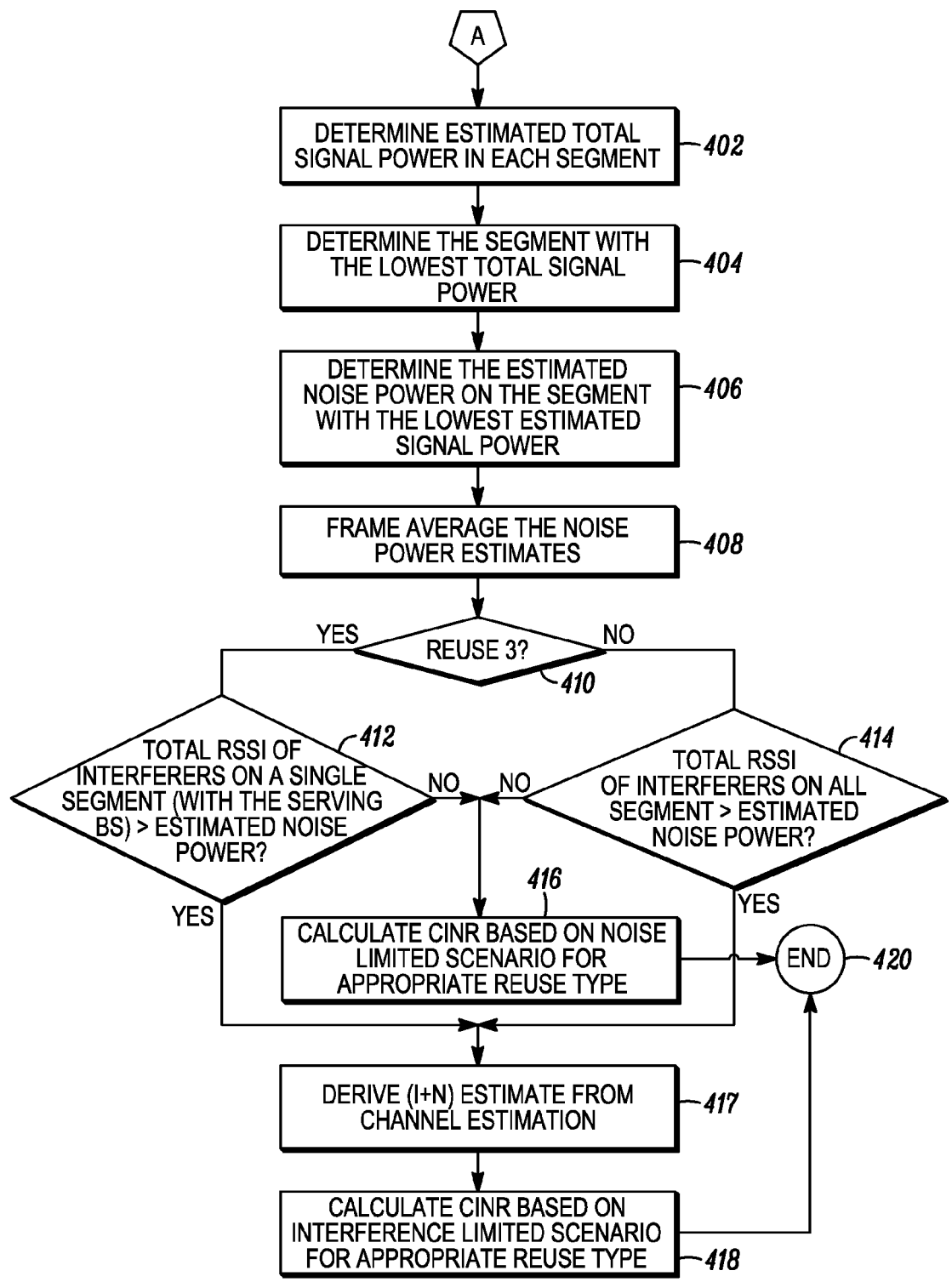

With reference to FIGS. 3-4, an example process 300 for determining RSSIs of serving and non-serving BSs and a CINR of a serving BS at a subscriber station (SS) is depicted. The SS and BSs may be in a communication network, such as the one shown in FIG. 1 and use a frame format of the type shown in FIG. 2. In block 302 a discrete Fourier transform (DFT) is performed on a received signal (see equation (1)). Next, in block 304, preamble sequences of target (serving) and interferer (non-serving) BSs are extracted from, for example, a memory. A unique preamble sequence is associated with a Cell ID, which is available to a BS in an IEEE 802.16e compliant system. Then, in block 306, the received signal is divided by a preamble of each BS to obtain a divided signal for each BS. Next, in block 308, a shift-one cross-correlation is performed on the divided received signal associated with each BS to provide a coarse RSSI estimates for each BS (see equation (10)). The total number of potential interfering BSs is typically limited to the number of unique cell IDs on a segment, which is thirty-eight for IEEE 802.16e. The low complexity step can be performed for the whole set or a subset if additional knowledge of the number and the cell IDs of potential interferers is available to the SS, which is possible if the serving BS updates a neighbor list at the SS. In block 310, the coarse RSSI estimates for each of the BSs are frame-averaged to provide average RSSI estimates for each of the BSs (see equation (11)). Next, in block 312, the 'N' BSs with the largest averaged RSSI estimates are identified.

Then, in block 314, the 'N' averaged RSSI estimates are compensated based on shift-one cross-correlations between the target BS and the "N−1" interferer BSs (see equations (11)-(18)). The above operations for RSSI estimation of N significant interferers are performed on each segment in the preamble. Next, in block 402, total signal power, which includes the sum of RSSIs of all the active BSs and the white noise power, is estimated on each segment of a channel (see equations (23)-(24)). Then, in block 404, the segment with the lowest total power estimate is determined. Next, in block 406, an estimated noise power is determined on the segment with the lowest estimated total power, by subtracting the estimated RSSIs on that segment from the total signal power (see equation (25)). Next, in block 408, the estimated noise power is frame-averaged (see equations (26) and (27)). Then, in decision block 410, the reuse type is determined. When the reuse type is reuse-3 type, control transfers from block 410 to decision block 412. In block 412, it is determined whether the sum of RSSIs of interferers on the segment with the serving BS is greater than an estimated noise power (see equation (41)). If so, control transfers to block 417. Otherwise, control transfers from block 412 to block 416.

In block 410, if the reuse type is reuse-i type, control transfers from block 410 to decision block 414. In block 414, it is determined whether the RSSIs of interferers on all segments is greater than an estimated noise power (see equation (44)). If the RSSIs of interferers on all segments is greater than an estimated noise power, control transfers from block 414 to block 417. Otherwise, control transfers from block 414 to block 416. In block 416, CINR is calculated based on a noise-limited scenario for an appropriate reuse type (i.e., equation (43) for reuse-3 type and equation (46) for reuse-1 type). Following block 416, control transfers to block 420, where the process 300 ends. In block 417, an improved combined interference and noise (I+N) estimate is obtained with channel estimation (see equations (34)-(39)(39)). Next, in block 418, CINR is calculated based on an interference-limited scenario (see equation (42) for reuse-3 type and equation (45) for reuse-i type). Following block 418, control transfers to block 420 where the process 300 ends.

Accordingly, a number of techniques have been disclosed herein for accurately determining received strength signal indicator and carrier to interference and noise ratio estimates for received signals. The disclosed RSSI estimation technique is capable of compensating for inter-preamble interference caused by non-orthogonal preamble signals. With ideal detection (which is equivalent to knowledge of interferers from a neighbor list) and frame averaging, the techniques disclosed herein reliably estimate RSSI and CINR in both reuse-1 and reuse-3 type environments. Moreover, techniques for scanning and detecting active interfering base stations have been described herein which identify dominant interferers, e.g., the three interferers with the greatest RSSIs per segment. In this case, the RSSI of the strongest interfering base station can be estimated reliably, thereby providing for robust handoff initiation. In certain scenarios, attributed to, for example, non-zero and non-uniform cross-correlations of preamble sequences, false alarms may result in bias in CINR estimation. To address the false alarms, a hybrid approach may be implemented that utilizes the interference plus noise estimates obtained from channel estimation to provide reliable boost-compensated CINR estimates for both reuse-1 and reuse-3 type cases.

In sum, the channel-estimation-based approach does not compensate for non-orthogonality of preamble sequences and may cause inaccurate CINR reporting, especially for smaller DFT sizes (e.g., FFT size=512, preamble length=143, bandwidth=5 MHz) and interference-limited systems like IEEE 802.16e compliant deployments. The difference-based approach, which assumes the channels are the same on adjacent subcarriers, also results in biased CINR estimates which are unacceptable at higher CINRs required for IEEE 802.16e compliance. By explicitly compensating for bias caused by non-orthogonality of preamble sequences in the RSSI computation and bias due to channel estimation in the I+$N_o$ computation, more accurate CINR estimates can be achieved.

Both the channel-estimation-based approach and the difference-based approach subtract an I+$N_o$ value from a total power estimate to produce in an RSSI estimate. At low CINRs, this introduces large errors in RSSI estimates. According to the present disclosure, RSSI is estimated by isolating signal power directly and performing autonomous low complexity scanning in the process. Neither the channel-estimation-based approach nor the difference-based approach provides an opportunity to compensate for preamble boosting. Without accurate boosting compensation, CINR estimates can be off by 4.5 dB.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present disclosure, further discussion of such software and ICs, if any, will be limited to the essentials with respect to the principles and concepts within the various embodiments.

It will be appreciated that the methods and the wireless devices described herein may include one or more conventional processors and unique stored program instructions that control the one or more processors, to implement, in conjunction with certain non-processor circuits, some of the functions of the electronic device described herein. The non-processor circuits may include, but are not limited to, a radio receiver, a radio transmitter, signal drivers, clock circuits, power source circuits, and user input devices.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

What is claimed is:

1. A method for determining a received signal strength indicator of a target base station at a subscriber station, comprising:
    performing a discrete Fourier transform on a received signal to provide a transformed signal, the transformed signal occupying one or more segments of a channel, the one or more segments each including multiple subcarriers; and
    calculating an shift-n cross-correlation based on the transformed signal and a preamble sequence of the target base station to provide a coarse received signal strength indicator for the target base station.

2. The method of claim 1, wherein the shift-n cross-correlation is a shift-one cross-correlation and the calculating further comprises:
    dividing the transformed signal by the preamble sequence of the target base station to obtain a referenced signal; and
    calculating the shift-one cross-correlation between the referenced signal and a replica of the referenced signal to provide the coarse received signal strength indicator of the target base station, wherein the replica of the referenced signal corresponds to the reference signal shifted by one.

3. The method of claim 1, wherein the shift-n cross-correlation is a shift-one cross-correlation and the calculating further comprises:
    obtaining a first shift-one autocorrelation vector of the transformed signal by multiplying the transformed signal at one subcarrier with the transformed signal at a next subcarrier;
    obtaining a second shift-one autocorrelation vector of the preamble sequence by multiplying an inverse of a preamble symbol at one subcarrier with an inverse of another preamble symbol at a next subcarrier; and
    calculating cross-correlation of the first and second shift-one autocorrelation vectors.

4. The method of claim 1, wherein the calculating further comprises:
    averaging values of the coarse received signal strength indicator obtained over a plurality of frames.

5. The method of claim 1, further comprising:
    calculating a shift-one cross-correlation based on the transformed signal and a preamble sequence of an interferer base station to obtain a coarse received signal strength indicator for the interferer base station; and adjusting the coarse received signal strength indicators of the target and interferer base stations by compensating for bias due to preamble correlation.

6. The method of claim 5, wherein the adjusting the coarse received signal strength indicators further comprises:

obtaining cross-correlation factors of a first shift-one autocorrelation vector of the preamble sequence of the target base station and a second shift-one autocorrelation vector of the preamble sequence of the interferer base station; and calculating a bias compensated received signal strength indicator for the target base station based on the coarse received signal strength indicators of the target and interferer base stations and the cross-correlation factors.

7. The method of claim 5, further comprising:

obtaining coarse received signal strength indicators for a plurality of non-target base stations; and selecting a set of the non-target base stations based on the coarse received signal strength indicators.

8. A method for determining carrier to interference and noise ratio of a target base station at a subscriber station, comprising:

performing a discrete Fourier transform on a received signal to provide a transformed signal, the transformed signal occupying one or more segments of a channel, the one or more segments each including multiple subcarriers;

calculating a received signal strength indicator for the target base station based on a shift-one cross-correlation of the transformed signal and a preamble sequence of the target base station;

calculating respective received signal strength indicators for one or more interferer base stations on the one or more segments based on a shift-one cross-correlation of the transformed signal and preamble sequences of the one or more interferer base stations;

determining a noise power estimate from a single one of the one or more segments; and determining the carrier to interference and noise ratio for the target base station based on the received signal strength indicators for the target base station and the one or more interferer base stations and the noise power estimate.

9. The method of claim 8, wherein the determining a noise power estimate further comprises:

estimating frame-averaged total powers of the received signal on each of the one or more segments over a plurality of frames;

obtaining frame-averaged received signal strength indicators for one or more base stations on a single one of the one or more segments with a lowest estimated average total power; and subtracting from the frame-averaged total power on the single one of the one or more segments with the lowest estimated average total power a summation of the frame-averaged received signal strength indicators of all of the one or more base stations on the single one of the one or more segments with the lowest estimated average total power to obtain the noise power estimate.

10. The method of claim 9, wherein the obtaining frame-averaged received signal strength indicators further comprises:

estimating frame-averaged received signal strength indicators for a plurality of base stations; and selecting one or more strongest base stations from the plurality of base stations based on values of the frame-average received signal strength indicators.

11. The method of claim 8, wherein the determining a noise power estimate further comprises:

averaging instantaneous noise power estimates obtained over a plurality of frames.

12. The method of claim 8, wherein the determining a carrier to interference and noise ratio further comprises:

weighting the noise power estimate based on a transmission power boosting factor of the preamble sequence relative to non-preamble regular data subcarriers.

13. The method of claim 8, wherein the determining a carrier to interference and noise ratio further comprises:

summing the received signal strength indicators of the one or more interferer base stations either on the same segment as the target base station or on all the segments according to a reuse scenario;

determining whether summed interference power is greater than the noise power estimate to determine interference or noise limited scenario;

determining a total interference and noise power estimate based on the determined interference or noise limited scenario; and computing the carrier to interference and noise ratio for the target base station as a ratio between the received signal strength indicator of the target base station and the total interference and noise power estimate.

14. The method in claim 13, wherein the determining a total interference and noise power estimate further comprises:

computing a combined noise plus interference power on the segment used by the target base station when the summed interference power is greater than the noise power estimate;

determining, for the interference limited scenario, a total interference power based on the combined noise plus interference power on the segment used by the target base station, the received signal strength indicators of the one or more interferer base stations on the one or more segments, and the noise power estimate; and determining, for the noise limited scenario, the total interference power based on the received signal strength indicators of the one or more interferer base stations on the one or more segments and the noise power estimate.

15. A communication system, comprising:

a target base station; and a subscriber station in communication with the target base station, wherein the subscriber station is configured to:

perform a discrete Fourier transform on a received signal to provide a transformed signal, the transformed signal occupying one or more segments of a channel, the one or more segments each including multiple subcarriers; and calculate an shift-n cross-correlation based on the transformed signal and a preamble sequence of the target base station to provide a coarse received signal strength indicator for the target base station.

16. The communication system of claim 15, wherein the shift-n cross-correlation is a shift-one cross-correlation and the subscriber station calculates the shift-one cross-correlation by:

dividing the transformed signal by the preamble sequence of the target base station to obtain a referenced signal; and calculating the shift-one cross-correlation between the referenced signal and a replica of the referenced signal to provide the coarse received signal strength indicator of the target base station, wherein the replica of the referenced signal corresponds to the reference signal shifted by one.

17. The communication system of claim 15, wherein the shift-n cross-correlation is a shift-one cross-correlation and the subscriber station calculates the shift-one cross-correlation by:
   obtaining a first shift-one autocorrelation vector of the transformed signal by multiplying the transformed signal at one subcarrier with the transformed signal at a next subcarrier;
   obtaining a second shift-one autocorrelation vector of the preamble sequence by multiplying an inverse of a preamble symbol at one subcarrier with an inverse of another preamble symbol at a next subcarrier; and
   calculating cross-correlation of the first and second shift-one autocorrelation vectors.

18. The communication system of claim 15, wherein the subscriber station calculates the shift-one cross-correlation by:
   averaging values of the coarse received signal strength indicator obtained over a plurality of frames.

19. The communication system of claim 15, wherein the subscriber station is further configured to:
   calculate a shift-one cross-correlation based on the transformed signal and a preamble sequence of an interferer base station to obtain a coarse received signal strength indicator for the interferer base station; and
   adjust the coarse received signal strength indicators of the target and interferer base stations by compensating for bias due to preamble correlation.

20. The communication system of claim 19, wherein the subscriber station adjusts the coarse received signal strength indicators by:
   obtaining cross-correlation factors of a first shift-one autocorrelation vector of the preamble sequence of the target base station and a second shift-one autocorrelation vector of the preamble sequence of the interferer base station; and
   calculating a bias compensated received signal strength indicator for the target base station based on the coarse received signal strength indicators of the target and interferer base stations and the cross-correlation factors.

* * * * *